Figure 1:
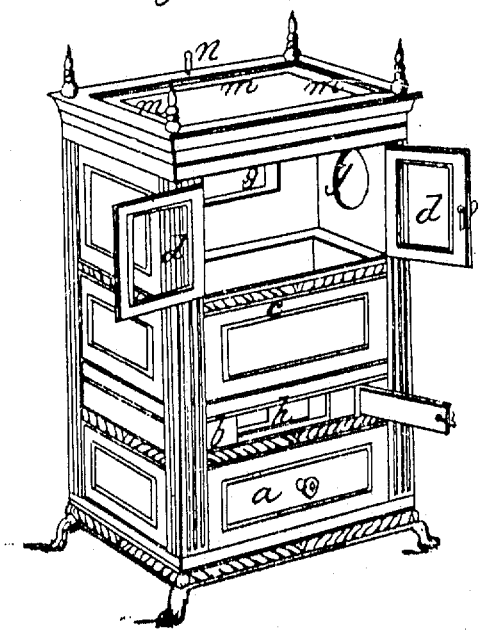

X 000 9801

J. Atwater.

Heating Stove.

No. Patented Jun. 30, 1836.

H. PETERS, PHOTO-LITHOGRAPHER, WASHINGTON, D. C.

James Atwater.
Letters Patent

The schedule referred to in these Letters Patent and making part of the same containing a description in the words of the said James Atwater himself of his improvement in stoves for burning Anthracite Coal.

Figure 2:
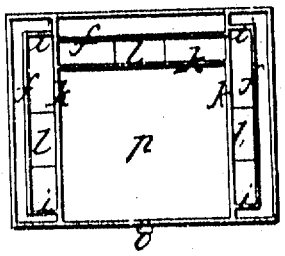

To all people to whom these presents shall come. Know ye that I James Atwater of the town of New Haven in the County of New-Haven and State of Connecticut. a citizen of said State and of the United States. have invented a new and useful improvement in Stoves used for burning hard or Anthracite coal and that the following is a description of the construction and operation of my improved Stove and of my invention. This stove is in the form of a rectangular Prism, and may be about fifteen inches wide and thirteen inches deep and twenty eight inches high. or in any other suitable proportion. For ornament it may have projections at the top and bottom. forming mouldings and giving the appearance of a base and capital. It is supported in the usual way by four feet at the four corners. The front plate has three openings one near the base for an ash drawer one a little higher. for a small door below the fuel to admit air and to aid the draft and for other purposes and one near the top for a large or double door above the fuel through which the stove is fed. Each door has isinglass in it to show the fire and the interior of the stove. The rear plate has one opening near the top to which a pipe may be attached to conduct off the smoke gasses from the fire. The exterior side plates are without openings. The top and bottom plates with their openings hereafter described and with their mouldings or projections complete the outside of the stove and it has the appearance of an ordinary rectangular cast iron stove. Its peculiarities consist principally in the interior arrangements which are as follows - Within the side and rear plates already described are three middle plates. (viz.) one on each side and one in the rear and these plates are placed about five eighths of an inch from the outer side plates and about one inch and one quarter ter of an inch from the outer rear plate. Each of these middle plates has
an opening near the top through which drafts or flues are to be made to pass
and the middle rear plate has an opening below the grate or fire for the same
purpose. Each of these middle plates at the sides has projections or flanges
perpendicular to the interior surface on the whole length of the sides and extend
-ing from the sides about one third of the way across the bottom and that portion of
the plate between the two points where the flanges terminate on the bottom is ex-
tended downward about four inches which extension has the same flange
on each side to its termination which the whole plate has already described
Both of these middle side plates are alike. The middle rear plate has flanges
across the bottom, and it is formed at the bottom with an extension in the
middle and flanges in the same manner as the middle side plates are form
ed. The flanges project about two inches. Within the plates last describ-
ed are three additional and innermost plates of the same length as the last
three and placed so as to come in close contact with all the flanges on the
middle plates. The two innermost side plates extend from the front to the
rear plate and all three of the innermost plates have the same projecting part
from the middle of the bottom downwards which the middle plates have so that
when the two sets of plates (viz) the middle and innermost plates are carefully
placed together they form three rectangular tubes at the bottom of each pair a-
bout four inches in length. Each of the innermost plates has the same open-
ings that the middle plates have. The bottom plate has three openings of a size and
shape and position to correspond with the three rectangular tubes already de
scribed and these openings must be carefully fitted to receive the tubes. The
top plate has open work over the space or chamber between the two sets of
interior plates. Each of the openings in the two sets of interior plates are connec
ted by a tube or flue making a connection and communication from the
inner chamber through the middle chamber to the outer chamber and
through these flues the several draughts of the stove are formed. There are
small projections cast at the bottom and on the inside of the three innermost
plates, on which a moveable plate rests and forms a chamber between this
and the bottom plate. On the inside of the innermost rear plate below
the grate or fire a slide or stopper is placed in the usual way which [illegible]

and closes the flue which passes through the middle chamber into the rear
chamber below the grate or fire. This forms the lower or downward draughts.
On the outside of the opening at the top of the middle rear plate is placed a
slide or stopper with a handle projecting upward through the top plate by
which the flue above the fire which passes through the middle chamber into
the rear chamber is opened and shut. This forms the upper direct draught
Inside of the innermost plates is a lining of fire brick or other suitable substance
in the usual manner and a grate on which the fuel is placed. One of the
bars of the grate near the middle of the same, has a hollow groove on the
under side which rests on a rod which draws out in front and then the
grooved bar and one or two others with which it is connected turn on
a hinge or pivot, and drop down and empty the contents of the stove which
rest on the grate into the ash pan below. The moveable part of the grate
is then brought back and made to rest on the rod which is replaced
as before. The top plate has a rectangular opening of the size of the
part of the stove which contains the fuel and over this opening is placed a
moveable plate which can be removed at pleasure. That this description
may be more readily understood I add a drawing containing two figures.
Figure I. shows a perspective view of an improved stove. a. denotes the
ash draw in the opening made therefor. b, shows the opening for the small
door below the grate. The large opening for the double door d,d. is seen
immediately above c, Figure II. shows a horizontal section of the
stove above or below the fire brick and the observer is supposed to look
downward upon the same f,f,f, show the middle plates on the sides
and rear. Figure I g,g, shows one of the openings extending through one
of the side plates and the opening through the rear plate through which
openings the upper draughts of the stove are formed. Figure II i,i,i,i,
shows side flanges on the middle plates at the sides k,k,k, show the
innermost side and rear plates. The openings through the bottom
plate are seen at l,l,l Figure I m,m,m, shows the open work in
the top plate. The handle of the stopper which closes the opening through
the upper part of the middle rear plate is seen at n, Figure II o, shows
a small projection attached a moveable plate which lies immediately
under under the ash draw and with the bottom plate form the chamber already
described. p. shows the chamber of combustion. The spaces above the bot-
tom plate and between the plates k. k. k. and the plates f. f. f. f. of a lighter
shade show the pure atmospheric air chambers. The spaces between the
plates f. f. f. and the outside plates of a darker shade show the burned air
and gas chamber. When the stove is filled and ready to be ignited and the
stopper attached to "n." Figure 2 is removed the stove has the direct draught
of a common furnace stove. When this stopper is closed and prevents
the draught from passing through the upper and rear flue directly, then
the draught passes indirectly through the side flues one of which is seen
at g. figure 1. thence down the outer side chambers called above the
burned air and gas chambers thence through the chambers between the
moveable plate beneath the ash draw and the bottom plate. thence up the
outer back side chamber for burned air &c as above described thence off in
the usual way through the opening in the rear plate. The pure air, in
the atmospheric air chambers, is in the mean time warmed by radia-
tion from the adjoining plates and is thus made to circulate through its
chamber coming in at the bottom through the openings in the bottom
plate and passing off through the openings in the top plate. When the direct
upper draught is closed, the ash draw in its place, the lower door shut,
the upper door open and the stopper removed which regulates the opening
in the innermost rear plate below the fire then the draught is down
ward through the fuel, then through the lower opening aforesaid and
thence into the back chamber for burnt air &c. and then off as before.
(This flue should be opened whenever the stove is cleaned of ashes &c. to
prevent dust from escaping into the room.) The principle object
sought to be accomplished by this stove is to secure within a common
sized space a large extent of radiating surface so arranged as to dif
fuse the heat in a rapid and effectual manner while all the benefits
of a direct and powerful draught when needed are retained and also
(the advantage of a downward draught to prevent scattering dust
when the stove is cleaned &c.) I claim therefore as my invention the
peculiar combination of the above described atmospheric air cham-
bers (560) 525 but with the indirect draught and near both of the other draughts which combination is so modified as to cause the heat when the indirect or cir-cuitous draught is used to come in contact with all the outer plates of the stove, and also at the same time with all the middle plates and flanges which form part of the said atmospheric air chambers while the innermost plates which complete the same air chambers are heated by the direct action of the fire in the ordinary manner.
And I do not claim the whole stove as new nor any of the several sep-arate parts thereof nor any other combination than that above descri-bed nor the construction of the whole or any part thereof except so far as is required to accomplish the modified combination claimed as aforesaid.

In testimony that the foregoing is a true specification of my said improvement I have hereunto set my hand at New Haven this sixth day of May A.D. one thousand eight hundred and thirty six Witnesses
Samuel J. Hitchcock
[illegible] P. Sanford James Atwater

[illegible]

2016 [illegible]

Ex[illegible] Ch[illegible]